US012599067B2

(12) United States Patent 　　　　　(10) Patent No.:　US 12,599,067 B2
Ehrman et al. 　　　　　　　　　　　　　(45) Date of Patent:　　Apr. 14, 2026

(54) CONTROLLED ENVIRONMENT PRODUCTION FACILITY

(71) Applicant: Growup Group Limited, Bristol (GB)

(72) Inventors: Thomas Ehrman, Bristol (GB);
　　　　　　　Thomas Webster, Bristol (GB)

(73) Assignee: Growup Group Limited, Bristol (GB)

( * ) Notice:　　Subject to any disclaimer, the term of this patent is extended or adjusted under 35 U.S.C. 154(b) by 9 days.

(21) Appl. No.:　18/281,443

(22) PCT Filed:　Mar. 11, 2022

(86) PCT No.:　PCT/GB2022/050642
　　　§ 371 (c)(1),
　　　(2) Date:　Sep. 11, 2023

(87) PCT Pub. No.: WO2022/189808
　　　PCT Pub. Date: Sep. 15, 2022

(65) 　　　　　Prior Publication Data
　　　US 2024/0049652 A1　　Feb. 15, 2024

(30)　　　Foreign Application Priority Data

Mar. 12, 2021　(GB) .................................... 2103487

(51) Int. Cl.
　　　*A01G 9/24*　　　　　(2006.01)
(52) U.S. Cl.
　　　CPC ............. *A01G 9/246* (2013.01); *A01G 9/249*
　　　　　　　　　　　　　　　　　　　(2019.05)
(58) Field of Classification Search
　　　CPC .................................. A01G 9/46; A01G 9/249
　　　See application file for complete search history.

(56)　　　　　　　References Cited

U.S. PATENT DOCUMENTS

| | | | | |
|---|---|---|---|---|
| 4,567,732 | A * | 2/1986 | Landstrom ............. | A01G 9/246 |
| | | | | 47/17 |
| 4,594,850 | A * | 6/1986 | Joy ......................... | F01K 23/16 |
| | | | | 60/737 |
| 6,050,083 | A * | 4/2000 | Meckler ................... | F01K 23/10 |
| | | | | 60/39.181 |
| 6,250,080 | B1 * | 6/2001 | Shelor ...................... | F02G 5/00 |
| | | | | 60/618 |
| 10,165,734 | B1 * | 1/2019 | Shelor ...................... | F24F 11/70 |
| 2015/0282440 | A1 * | 10/2015 | Shelor .................... | A01G 9/246 |
| | | | | 47/17 |
| 2016/0010899 | A1 * | 1/2016 | Johnson .................. | F25B 15/00 |
| | | | | 62/189 |
| 2019/0141911 | A1 * | 5/2019 | Nguyen .................. | F21V 29/50 |
| | | | | 165/64 |
| 2020/0000045 | A1 * | 1/2020 | Shelor .................... | A01G 9/246 |

FOREIGN PATENT DOCUMENTS

| | | | | | |
|---|---|---|---|---|---|
| CA | 3050794 | A1 * | 11/2019 | .............. | A01G 9/14 |
| GB | 2234415 | A | 2/1991 | | |
| KR | 100773435 | B1 * | 11/2007 | ............ | F24F 3/1423 |
| WO | WO-2025166932 | A1 * | 8/2025 | ........... | F24H 9/0005 |

* cited by examiner

*Primary Examiner* — Ebony E Evans
(74) *Attorney, Agent, or Firm* — Standley Law Group LLP; Beverly A. Marsh; Adam J. Smith

(57)　　　　　　　　ABSTRACT

According to the invention there is provided a controlled environment production facility, including: a climate controlled growing chamber, and an absorption chiller. The climate controlled growing chamber includes artificial lighting and at least one cooling and dehumidification unit. The cooling and dehumidification unit is supplied with chilled water from the absorption chiller.

6 Claims, 1 Drawing Sheet

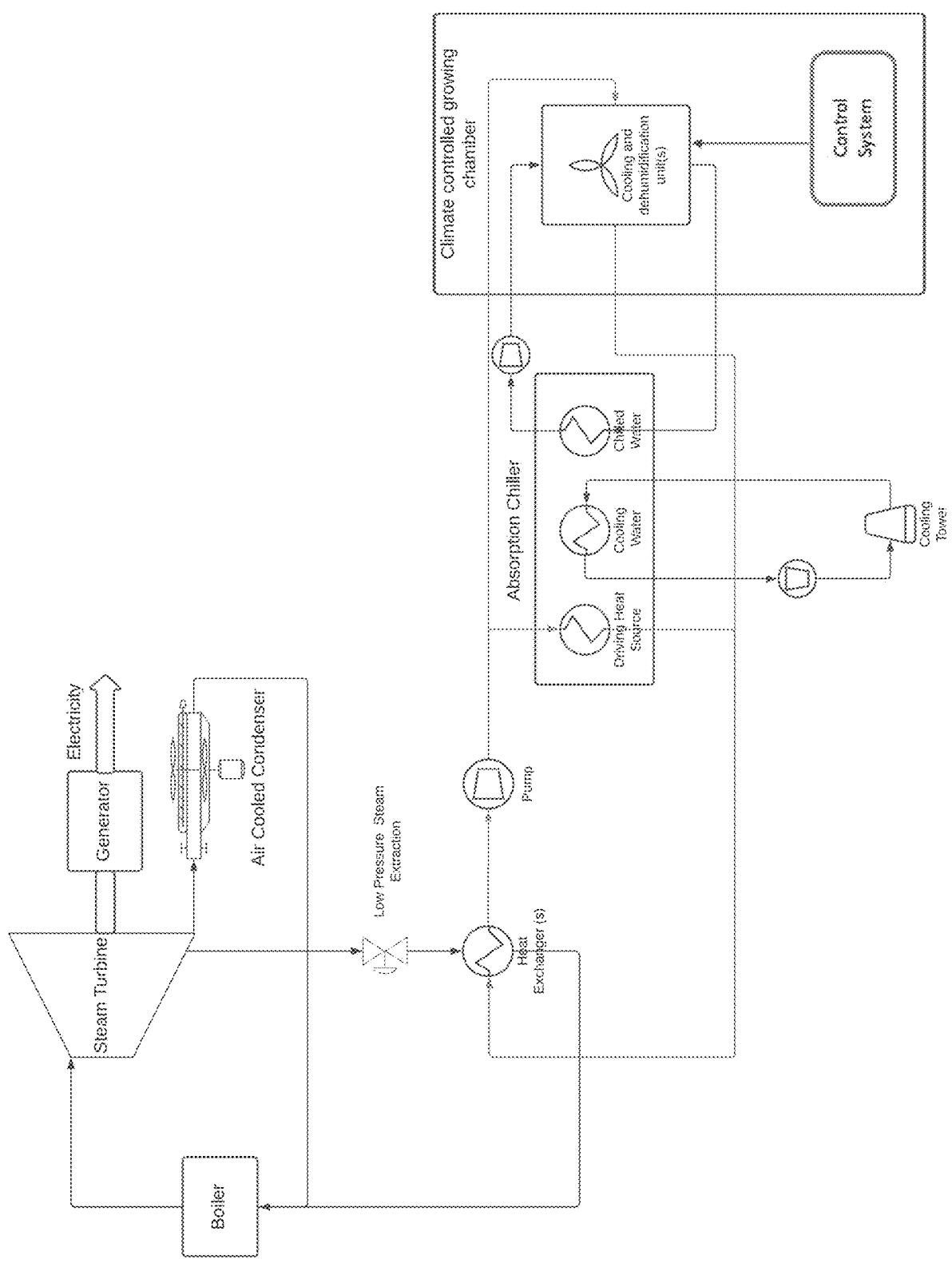

CONTROLLED ENVIRONMENT PRODUCTION FACILITY

The present invention relates to a controlled environment production (CEP) facility, and more particularly to climate control of a CEP horticultural growing facility.

BACKGROUND

In controlled-environment agriculture, plants are grown in an enclosed structure (such as a building), rather than outdoors. Since the structure is enclosed, the environment within the structure can be controlled, to optimize growing conditions. In particular, factors such as temperature, humidity, carbon dioxide concentration and light can be controlled, and pests can be excluded from the environment.

As a CEP facility is an enclosed structure, it is normally necessary to provide artificial light sources so that the plants within the structure can photosynthesize and grow. These light sources will also produce heat, causing the temperature within the structure to rise. In order for the temperature within the structure to be maintained at an appropriate level, means must be provided to remove excess heat.

Further, transpiration of the growing plants will tend to increase the relative humidity within the structure. Dehumidification means are necessary to maintain the relative humidity within the structure at an appropriate level.

Conventionally, cooling means have been provided in the form of vapour compression refrigeration cycle cooling plant, to provide electrically powered cooling for both removal of heat and humidity. If additional dehumidification is required, then desiccant dehumidification means can be provided.

However, the energy consumption of the vapour compression refrigeration cycle cooling plant is high, and in some cases can be more than the energy required to power the lights. Further, with certain crops, such as leafy greens, the energy required to dehumidify the re-circulated air can be the single largest energy demand in the system, exceeding the power needed for both lighting and cooling. These high energy requirements are a barrier to widespread adoption of CEP in horticulture.

STATEMENT OF INVENTION

In at least its preferred embodiment, the invention provides a CEP facility with a much lower power requirement.
The invention is defined in the appended claims.

DESCRIPTION OF FIGURES

A preferred embodiment of the invention will now be described with reference to the accompanying drawing of FIG. 1, which is a schematic drawing of a CEP facility together with a combined heat and power (CHP) source.

DETAILED DESCRIPTION

The CEP facility includes a climate controlled growing chamber in which plants are grown, and an absorption chiller. The growing chamber is an enclosed environment, and is provided with artificial lighting. Typical conditions in the growing chamber are a temperature of around 18° C. to 30° C., and a relative humidity within the range to 55% to 80%. Crop transpiration rates can be up to 150 grams per square metre of growing area per hour.

Maintaining these conditions in the chamber using refrigerant dehumidification requires a chilled water temperature of 2° C. to 3° C. Achieving this with conventional vapour compression refrigeration cycle cooling plant requires a considerable amount of energy, and thus a considerable carbon footprint. Further, vapour compression refrigeration cycle cooling plant often uses CFCs or HCFCs, and this is undesirable in view of the environmental issues associated with these chemicals.

The inventors have found that absorption chillers are capable of achieving a chilled water temperature of 2° C. to 3° C., and thus are capable of delivering the required cooling and dehumidification. Absorption chillers use a mixture of water and ammonia, or water and lithium bromide, rather than CFCs or HCFCs, to cool water, and are powered by waste heat rather than electricity. The use of a mixture of water and lithium bromide is preferred, as this is non-toxic.

Absorption chillers normally require a large and consistent stream of waste heat in order to operate, which can limit their use, as such a heat source may not always be available. However, if the electricity used to power the artificial light sources in the growing chamber is provided by a combined heat and power plant, then the heat generated by the combined heat and power plant can be used to power the absorption chiller.

In FIG. 1, a combined heat and power plant includes a boiler, a steam turbine and a generator. The generator may produce the electricity used to power the artificial light sources in the growing chamber; alternatively, the generator may supply electricity to the grid, and the artificial light sources may be powered with electricity from the grid. Low pressure steam is extracted from the steam turbine, and passes through a heat exchanger, where heat from the low pressure steam is transferred to a flow of water.

Part of this flow of water is directed to the heat source of the absorption chiller, and heat from the water is used to power the absorption chiller to produce chilled water. The rest of the flow of water passes to cooling and dehumidification units in the climate controlled growing chamber. In addition, chilled water from the absorption chiller is also supplied to the cooling and dehumidification units in the climate controlled growing chamber.

As the skilled person would be familiar with absorption chillers and their operation, this will not be described further.

In use, electricity is supplied to the artificial light sources in the climate controlled growing chamber. As mentioned above, this electricity may come from the combined heat and power plant, or from the grid. As well as light, the artificial light sources produce heat, which increases the temperature within the climate controlled growing chamber. Further, an increase in temperature can lead to an increase in the rate of transpiration, and so also increase the relative humidity within the climate controlled growing chamber.

The climate controlled growing chamber is provided with a control system configured to maintain the temperature and humidity in the climate controlled growing chamber at desired levels. Sensors are provided to monitor the temperature and relative humidity within the climate controlled growing chamber, and if it appears that the temperature and/or the relative humidity are going to exceed the maximum desired level, the control system activates the cooling and dehumidification units in the climate controlled growing chamber.

At the same time, heat from the combined heat and power plant is supplied (via the heat exchanger) to the absorption chiller, which produces chilled water. This chilled water is supplied to the cooling and dehumidification units in the climate controlled growing chamber when they are activated, so that the temperature and relative humidity within the climate controlled growing chamber can be reduced.

In the embodiment described above, the absorption chillers use heat from the combined heat and power plant to produce chilled water for the cooling and dehumidification units. It will be appreciated that any suitable heat source can be used, although the use of waste heat is preferred, to reduce the carbon footprint of the overall process. If heat must be generated specifically to operate the absorption chillers, then it is preferred that a low carbon or carbon neutral heat source (such as solar thermal) is used, although heat from a gas engine could also be used as the heat source.

The application of absorption chilling to provide the cooling load necessary for climate control in CEP horticulture makes possible the use of combined heat and power generation for CEP horticulture. This can reduce the significant energy cost barrier to wider adaptation of the production method.

The invention claimed is:

1. A controlled environment production facility, including:

an absorption chiller;

a climate controlled growing chamber comprising:

artificial light sources which provide artificial lighting so that plants within the climate controlled growing chamber can photosynthesize and grow; and at least one cooling and dehumidification unit supplied with chilled water from the absorption chiller during operation; and a control system configured to maintain the temperature and humidity in the climate controlled growing chamber at desired levels, the control system including sensors to monitor the temperature and relative humidity within the climate controlled growing chamber, and means to activate the at least one cooling and dehumidification unit in the climate controlled growing chamber prior to the temperature and/or the relative humidity exceeding a maximum desired level; and a heat source for driving the absorption chiller, wherein the heat source is a combined heat and power plant.

2. The controlled environment production facility of claim 1, wherein the artificial lighting in the climate controlled growing chamber is powered by electricity from the combined heat and power plant when operated.

3. The controlled environment production facility of claim 2 wherein the combined heat and power plant includes a boiler, a steam turbine, and a generator.

4. A method of controlling an environment of a controlled environment production facility, said method comprising:

operating artificial light sources of the controlled environment production facility to provide artificial lighting so that plants within a climate controlled growing chamber of the controlled environment production facility can photosynthesize and grow;

monitoring temperature and humidity in the climate controlled growing chamber by way of sensors of a control system of the controlled environment production facility; and maintaining the temperature and humidity in the climate controlled growing chamber at desired levels by way of the control system, including a activating at least one cooling and dehumidification unit of the controlled environment production facility supplied with chilled water from an absorption chiller of the controlled environment production facility during operation prior to the temperature and/or the relative humidity exceeding a maximum desired level;

wherein the controlled environment production facility further includes a heat source for driving the absorption chiller, wherein the heat source is a combined heat and power plant.

5. The method of claim 4 in which the controlled environment production facility produces at least one foodstuff.

6. The method of claim 5 in which the controlled environment production facility produces at least one salad crop.

* * * * *